(12) United States Patent
Hiramoto et al.

(10) Patent No.: US 8,902,291 B2
(45) Date of Patent: Dec. 2, 2014

(54) THREE-DIMENSIONAL IMAGE PICKUP DEVICE

(75) Inventors: Masao Hiramoto, Osaka (JP); Teruyuki Takizawa, Osaka (JP); Masayuki Misaki, Hyogo (JP); Yasunori Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 13/388,313

(22) PCT Filed: Feb. 10, 2011

(86) PCT No.: PCT/JP2011/000763
§ 371 (c)(1),
(2), (4) Date: Feb. 1, 2012

(87) PCT Pub. No.: WO2011/151948
PCT Pub. Date: Dec. 8, 2011

(65) Prior Publication Data
US 2012/0133743 A1 May 31, 2012

(30) Foreign Application Priority Data
Jun. 2, 2010 (JP) .................................. 2010-127239

(51) Int. Cl.
*H04N 13/02* (2006.01)
(52) U.S. Cl.
CPC ........... *H04N 13/0214* (2013.01); *H04N 13/02* (2013.01); *H04N 13/0217* (2013.01); *H04N 13/0235* (2013.01); *H04N 13/0271* (2013.01)
USPC ............................................ 348/46; 348/273
(58) Field of Classification Search
CPC ......... H04N 13/46; H04N 5/40; H04N 5/335; H04N 5/34; G06K 9/34; G06K 9/40
USPC ...................... 348/302, 273, 46; 382/173, 255
See application file for complete search history.

(56) References Cited

U.S. PATENT DOCUMENTS 6,807,295 B1 * 10/2004 Ono .............................. 382/154
6,977,674 B2 12/2005 Seo
(Continued)

FOREIGN PATENT DOCUMENTS

JP 62-217790 A 9/1987
JP 62-291292 A 12/1987
(Continued)

OTHER PUBLICATIONS

Beyond One Perspective:Using Video Camera Arrays for Graphics; by Marcus Magnor et al., Siggraph2006.*
(Continued)

*Primary Examiner* — Dave Czekaj
*Assistant Examiner* — Dramos I Kalapodas
(74) *Attorney, Agent, or Firm* — Renner, Otto, Boisselle & Sklar, LLP

(57) ABSTRACT

The 3D image capture device of this invention includes: a light-transmitting section 2 with light-transmitting areas C1, C2 and C3 that have mutually different transmission wavelength ranges; a solid-state image sensor 1 arranged to receive the light that has been transmitted through the light-transmitting section 2; and an optical system 3 configured to produce an image on an imaging area of the solid-state image sensor 1, which includes a photosensitive cell array and a color filter array on the imaging area. The transmission wavelength ranges of the light-transmitting areas and the color filters are defined such that the light that has been transmitted through at least one of the light-transmitting areas C1, C2 and C3 is transmissible through at least two of the color filters. A signal processing section generates data of at least two images with parallax by generating signals representing at least two of the respective intensities of light rays that are incident on the light-transmitting areas based on the output signals of the photosensitive cells.

19 Claims, 10 Drawing Sheets

(56) References Cited

U.S. PATENT DOCUMENTS

| | | | |
|---|---|---|---|
| 2002/0171740 A1* | 11/2002 | Seo | 348/207.99 |
| 2006/0092314 A1* | 5/2006 | Silverstein et al. | 348/349 |
| 2008/0247670 A1* | 10/2008 | Tam et al. | 382/298 |
| 2009/0284627 A1* | 11/2009 | Bando et al. | 348/273 |
| 2010/0103276 A1* | 4/2010 | Border | 348/222.1 |
| 2011/0018974 A1* | 1/2011 | Wang | 348/49 |
| 2011/0050941 A1 | 3/2011 | Hiramoto et al. | |
| 2011/0273538 A1* | 11/2011 | Suzuki | 348/49 |
| 2012/0293634 A1* | 11/2012 | Ishii et al. | 348/49 |
| 2013/0120540 A1* | 5/2013 | Ishii et al. | 348/49 |

FOREIGN PATENT DOCUMENTS

| | | |
|---|---|---|
| JP | 02-171737 A | 7/1990 |
| JP | 2001-016611 A | 1/2001 |
| JP | 2002-344999 A | 11/2002 |
| JP | 2003-134533 A | 5/2003 |
| JP | 2008-153931 A | 7/2008 |
| JP | 2009-276294 A | 11/2009 |
| WO | 2010/058545 A1 | 5/2010 |

OTHER PUBLICATIONS

International Search Report for corresponding International Application No. PCT/JP2011/000763 mailed Apr. 5, 2011.

Co-pending U.S. Appl. No. 13/498,331, filed Mar. 27, 2012.

International Search Report for related International Application No. PCT/JP2011/002379 mailed Jul. 19, 2011.

Form PCT/ISA/237 for related International Application No. PCT/JP2011/002379 dated Jul. 19, 2011 and Partial English translation.

* cited by examiner

THREE-DIMENSIONAL IMAGE PICKUP DEVICE

TECHNICAL FIELD

The present invention relates to a single-lens 3D image capturing technology for capturing multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently and put on the market one after another.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax by using a single camera have been researched and developed. For example, Patent Document No. 1 discloses a scheme that uses two polarizers, of which the transmission axes cross each other at right angles, and a rotating polarization filter.

FIG. 13 is a schematic representation illustrating an arrangement for an image capturing system that adopts such a scheme. This image capturing system includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 9 for capturing the image that has been produced by the optical lens. In this arrangement, the half mirror 14 reflects the light that has been transmitted through the polarizer 11 and then reflected from the reflective mirror 13 but transmits the light that has been transmitted through the polarizer 12. With such an arrangement, the light beams that have been transmitted through the two polarizers 11 and 12, which are arranged at two different positions, pass through the half mirror 14, the circular polarization filter 15 and the optical lens 3 and then enter the image capture device 9, where an image is captured. The image capturing principle of this scheme is that two images with parallax are captured by rotating the circular polarization filter 15 so that the light beams that have been incident on the two polarizers 11 and 12 are imaged at mutually different times.

According to such a scheme, however, images at mutually different positions are captured time-sequentially by rotating the circular polarization filter 15, and therefore, two images with parallax cannot be captured at the same time, which is a problem. In addition, the durability of such a system is also a question mark because the system uses mechanical driving. On top of that, since the incoming light passes through the polarizers and the polarization filter, the quantity of the light received eventually by the image capture device 9 decreases by as much as 50%, which is non-negligible, either.

To overcome these problems, Patent Document No. 2 discloses a scheme for capturing two images with parallax at the same time without using such mechanical driving. An image capture device that adopts such a scheme gets the two incoming light beams, which have come from two different directions, condensed by a reflective mirror, and then received by an image sensor in which two different kinds of polarization filters are arranged alternately, thereby capturing two images with parallax without using a mechanical driving section.

FIG. 14 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image sensor 1. On its imaging area, the image sensor 1 has a number of pixels 10 and polarization filters 17 and 18, each of which is provided one to one for an associated one of the pixels 10. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light beams are transmitted through the polarizers 11 and 12, reflected from the reflective mirrors 13, passed through the optical lens 3 and then incident on the imaging area of the image sensor 1. Those light beams to be transmitted through the polarizers 11 and 12, respectively, and then incident on the image sensor 1 are transmitted through the polarization filters 17 and 18 and then photoelectrically converted by the pixels that are located right under those polarization filters 17 and 18. If the images to be produced by those light beams that have been transmitted through the polarizers 11 and 12 and then incident on the image sensor 1 are called a "right-eye image" and a "left-eye image", respectively, then the right-eye image and the left-eye images are generated by a group of pixels that face the polarization filters 17 and a group of pixels that face the polarization filter 18.

As can be seen, according to the scheme disclosed in Patent Document No. 2, two kinds of polarization filters, of which the transmission axes are arranged so as to cross each other at right angles, are arranged alternately over the pixels of the image sensor, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image sensor.

According to such a technique, however, the incoming light has its quantity decreased considerably when being transmitted through the polarizers and the polarization filters, and therefore, the quantity of the light received by the image sensor decreases as significantly as in Patent Document No. 1.

To cope with such a problem of the decreased quantity of light received, Patent Document No. 3 discloses a technique for obtaining two images with parallax and a normal image with a single image sensor. According to such a technique, those two images with parallax and the normal image can be obtained by a single image sensor by changing mechanically some components that have been used to capture two images with parallax with alternative components for use to capture a normal image, and vice versa. When two images with parallax are going to be obtained, two polarization filters are arranged on the optical path as disclosed in Patent Document No. 2. On the other hand, when a normal image is going to be obtained, those polarization filters are mechanically removed from the optical path. By introducing such a mechanism, those images with parallax and a normal image that uses the incoming light highly efficiently can be obtained.

Although a polarizer or a polarization filter is used according to the techniques disclosed in Patent Document Nos. 1 to 3, color filters may also be used according to another approach. For example, Patent Document No. 4 discloses a technique for obtaining two images with parallax at the same time using color filters. FIG. 15 schematically illustrates an image capturing system that adopts such a technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 4, images with parallax can be produced using the two color filters.

According to the technique disclosed in Patent Document No. 4, the light rays are imaged on the photosensitive film, thereby producing images with parallax there. Meanwhile, Patent Document No. 5 discloses a technique for producing images with parallax by transforming incoming light into electrical signals. FIG. 16 schematically illustrates a light beam confining plate according to Patent Document No. 5. According to such a technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 6 also discloses a technique for obtaining images with parallax using a similar configuration to the one illustrated in FIG. 16. FIG. 17 schematically illustrates a light beam confining plate as disclosed in Patent Document No. 6. According to that technique, by making the incoming light pass through R, G and B areas 23R, 23G and 23B of the light beam confining plate 23, images with parallax can also be produced.

According to the techniques disclosed in Patent Documents Nos. 4 to 6 mentioned above, images with parallax can be produced by arranging RGB color filters on a light beam confining plate. However, since the light beam confining plate is used, the percentage of the incoming light that can be used eventually decreases. In addition, to increase the effect of parallax, the RGB color filters should be arranged at distant positions and should have decreased areas. In that case, however, the percentage of the incoming light that can be used eventually further decreases.

Unlike these techniques, Patent Document No. 7 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Patent Application Laid-Open Publication No. 62-291292

Patent Document No. 2: Japanese Patent Application Laid-Open Publication No. 62-217790

Patent Document No. 3: Japanese Patent Application Laid-Open Publication No. 2001-016611

Patent Document No. 4: Japanese Patent Application Laid-Open Publication No. 2-171737

Patent Document No. 5: Japanese Patent Application Laid-Open Publication No. 2002-344999

Patent Document No. 6: Japanese Patent Application Laid-Open Publication No. 2009-276294

Patent Document No. 7: Japanese Patent Application Laid-Open Publication No. 2003-134533

SUMMARY OF INVENTION

Technical Problem

According to any of these conventional techniques, multiple images with parallax can be certainly obtained, but the quantity of the light received by the image sensor is smaller than usual because a polarizer or color filters are used. In order to receive a sufficient quantity of incoming light, a normal image that uses the incoming light highly efficiently should be obtained by using some mechanism that removes the polarizer or color filters from the optical path by mechanical driving. With such mechanical driving adopted, however, the overall size of the device increases too much and the manufacturing cost becomes too high.

The present invention provides a 3D image capturing technique for generating not only multiple images with parallax by using color filters without mechanical driving but also an image that uses the incoming light highly efficiently.

Solution to Problem

A 3D image capture device according to the present invention includes: a light-transmitting section with N light-transmitting areas (where N is an integer that is equal to or greater than three) that have mutually different transmission wavelength ranges; a solid-state image sensor arranged to receive the light that has been transmitted through the light-transmitting section; an optical system configured to produce an image on an imaging area of the solid-state image sensor; and a signal processing section configured to process the output signal of the solid-state image sensor. The solid-state image sensor includes a photosensitive cell array and a color filter array that is arranged to face the photosensitive cell array. The photosensitive cell array and the color filter array are both made up of a number of unit elements, each of which includes N photosensitive cells and N color filters. Each color filter is arranged to face an associated one of the N photosensitive cells. The color filters have mutually different transmission wavelength ranges. The transmission wavelength ranges of the N light-transmitting areas and the N color filters are defined such that the light that has been transmitted through at least one of the N light-transmitting areas is transmissible through at least two of the N color filters. And the signal processing section generates data representing at least two images with parallax by generating signals representing at least two of the respective intensities of light rays that are incident on the N light-transmitting areas based on the output signals of the N photosensitive cells.

In one preferred embodiment, the signal processing section generates data representing N images by generating signals representing the respective intensities of light rays that are incident on the N light-transmitting areas based on the output signals of the N photosensitive cells.

In another preferred embodiment, first and second areas that are included in the N light-transmitting areas are arranged on mutually opposite sides with respect to a line segment that passes the center of the light-transmitting section and that divides the area of the light-receiving plane of the light-transmitting section into two.

In this particular preferred embodiment, at least a part of a third area that is also included in the N light-transmitting areas is located between the first and second areas.

In a specific preferred embodiment, the third area is a transparent area.

In still another preferred embodiment, the transmission wavelength ranges of the first and second areas are wavelength ranges representing mutually different complementary colors.

In yet another preferred embodiment, the first and second areas have the same planar area, and the third area has a larger planar area than the first and second areas.

In yet another preferred embodiment, the broadest transmission wavelength range of one of the N light-transmitting areas is even broader than the broadest transmission wavelength range of one of the N color filters.

In yet another preferred embodiment, each of the N light-transmitting areas is either transparent or designed to transmit a light ray falling within the wavelength range associated with its complementary color.

In one preferred embodiment, N=3.

In a specific preferred embodiment, the N light-transmitting areas are a cyan area that transmits a cyan ray, a yellow area that transmits a yellow ray, and a transparent area.

In an alternative preferred embodiment, the N light-transmitting areas are a cyan area that transmits a cyan ray, a yellow area that transmits a yellow ray, and a magenta area that transmits a magenta ray.

In another preferred embodiment, the N color filters are a red filter that transmits a red ray, a green filter that transmits a green ray, and a blue filter that transmits a blue ray.

In still another preferred embodiment, each unit element includes four photosensitive cells, which are arranged in columns and rows to form a matrix, and four color filters, each of which is arranged to face an associated one of the four photosensitive cells. Two of the four color filters, which are arranged at a row 1, column 1 position and a row 2, column 1 position, respectively, are either transparent filters or green filters that transmit a green ray, while the other two color filters are a red filter that transmits a red ray and a blue filter that transmits a blue ray.

In another preferred embodiment, N=4.

In a specific preferred embodiment, the N light-transmitting areas are a cyan area that transmits a cyan ray, a yellow area that transmits a yellow ray, a magenta area that transmits a magenta ray and a transparent area.

In another specific preferred embodiment, the N color filters are a magenta filter that transmits a magenta ray, a green filter that transmits a green ray, a cyan filter that transmits a cyan ray, and a yellow filter that transmits a yellow ray.

In still another preferred embodiment, the signal processing section adds a signal representing the intensity of a light ray that has been incident on one of the N light-transmitting areas to a signal representing the intensity of a light ray that has been incident on another one of the transmitting areas, thereby raising the level of the signal representing the intensity of the light ray that has been incident on the latter transmitting area.

In this particular preferred embodiment, the signal processing section adds a signal representing the intensity of a light ray that has been incident on one of the N light-transmitting areas that has the broadest transmission wavelength range to a signal representing the intensity of a light ray that has been incident on another one of the transmitting areas, thereby raising the level of the signal representing the intensity of the light ray that has been incident on the latter transmitting area.

In yet another preferred embodiment, the signal processing section obtains color information using a signal representing the intensity of a light ray that has been incident on one of the N light-transmitting areas that has the broadest transmission wavelength range.

Advantageous Effects of Invention

According to the present invention, multiple images with parallax can be generated by using an image sensor with color filters and without making mechanical driving. In addition, according to the present invention, by appropriately defining the transmission wavelength ranges of the light-transmitting areas and color filters, an image can also be generated by using the incoming light highly efficiently.

DESCRIPTION OF EMBODIMENTS

Figure 1:
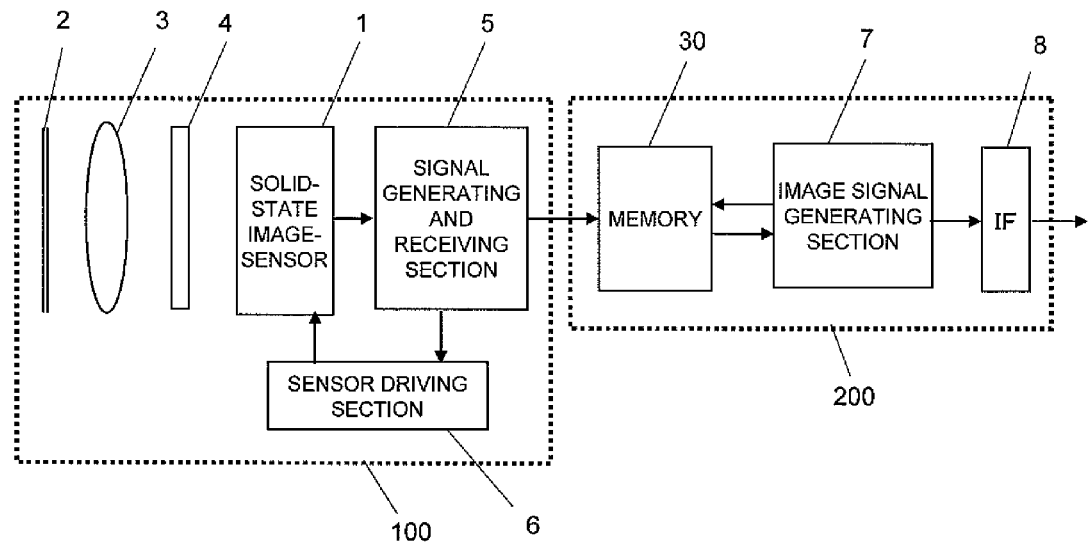
FIG. 1 is a block diagram illustrating an overall configuration for a first preferred embodiment of the present invention.

Hereinafter, preferred embodiments of the present invention will be described with reference to the accompanying drawings. In the following description, any element shown in multiple drawings and having substantially the same function will be identified by the same reference numeral. It should be noted that a signal or information representing an image will sometimes be referred to herein as just an "image".
(Embodiment 1)

FIG. 1 is a block diagram illustrating an overall configuration for an image capture device as a first preferred embodiment of the present invention. The Image Capture Device of this preferred embodiment is a digital electronic camera and includes an image capturing section 100 and a signal processing section 200 that receives a signal from the image capturing section 100 and outputs a signal representing an image (i.e., an image signal).

The image capturing section 100 includes an image sensor 1 with a number of photosensitive cells that are arranged on its imaging area, a light transmitting plate 2, which has three transmitting areas that have mutually different transmission wavelength ranges and which transmits the incoming light, an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 8 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image signal generating section 7 for generating an image signal by processing the signal supplied from the image capturing section 100, a memory 30 for storing various kinds of data that have been produced while the image signal is being generated, and an interface (I/F) section 8 for sending out the image signal thus generated to an external device. The image signal generating section 7 is preferably a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this preferred embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
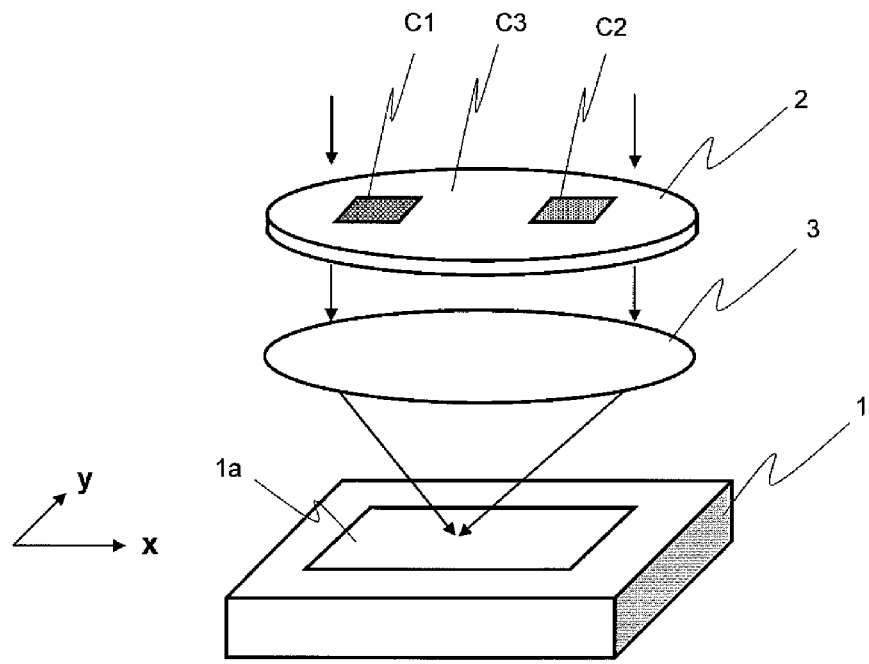
FIG. 2 schematically illustrates the relative arrangement of a light transmitting plate, an optical system and an image sensor according to the first preferred embodiment.

FIG. 2 schematically illustrates the relative arrangement of the light transmitting plate 2, the lens 3 and the image sensor 1 in the image capturing section 100. It should be noted that illustration of the other elements is omitted in FIG. 2. The light transmitting plate 2 has three transmitting areas C1, C2 and C3 that have mutually different transmission wavelength ranges and transmits the incoming light. The lens 3 is a known lens and condenses the light that has been transmitted through the light transmitting plate 2, thereby imaging the light on the imaging area 1a of the image sensor 1. In the following description, on a plane parallel to the imaging area 1a, the direction that points from the area C1 toward the area C2 will be referred to herein as "x direction" and the direction that is defined perpendicularly to the x direction will be referred to herein as "y direction".

Figure 3:
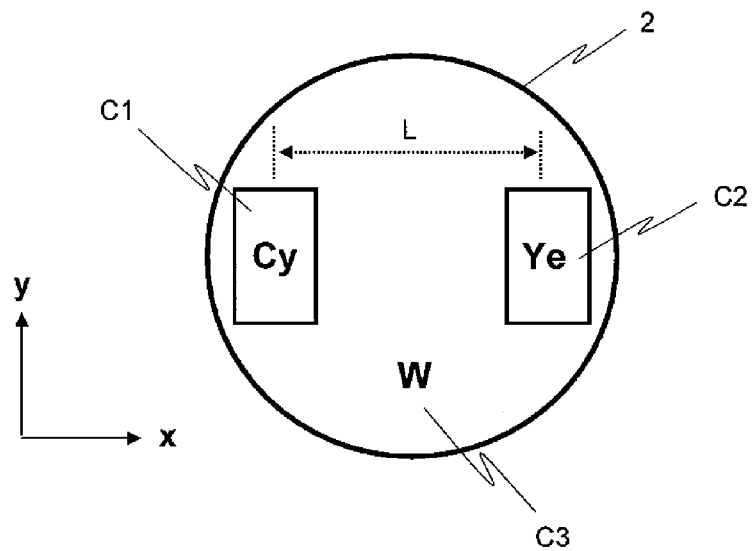
FIG. 3 illustrates an arrangement of light-transmitting areas on a light transmitting plate according to the first preferred embodiment.

FIG. 3 is a front view of the light transmitting plate 2 of this preferred embodiment. The light transmitting plate 2, as well as the lens 3, has a circular shape in this preferred embodiment but may also have any other shape. In the area C1, arranged is a color filter that transmits a light ray falling within the cyan (Cy) wavelength range (which will be referred to herein as a "Cy filter"). In the area C2, arranged is a color filter that transmits a light ray falling within the yellow (Ye) wavelength range (which will be referred to herein as a "Ye filter"). These color filters may be any known color filters. It should be noted that as long as these areas C1 and C2 of this preferred embodiment are designed so as to transmit only a light ray falling within the Cr wavelength range and only a light ray falling within the Ye wavelength range, respectively, and not to transmit a light ray falling within any other wavelength range, those areas C1 and C2 do not have to be color filters but may be any other kind of members. In this case, the areas C1 and C2 are arranged so as to be spaced apart from each other in the x direction. The distance L between these two areas C1 and C2 is determined by the size of the lens 3 so that the images obtained have appropriate parallax. The distance L may be set to fall within the range of several mm to several cm. Meanwhile, the other area C3 of the light transmitting plate 2 is a transparent area, which is made of a transparent member that transmits visible radiation included in white light (W) and falling within the entire wavelength range. The transparent member may be made of any material as long as the transparent member can transmit light with high transmittance. In this preferred embodiment, the areas C1 and C2 are designed to have the same planar area and the area C3 is designed to have a larger planar area than the areas C1 and C2.

It should be noted that the arrangement of the light transmitting plate 2 of this preferred embodiment is only an example of the present invention. And the present invention is in no way limited to that specific preferred embodiment. Rather, as long as a light transmitting section according to the present invention has three or more light transmitting areas that have mutually different transmission wavelength ranges, the properties, materials, shapes and sizes of those light transmitting areas may be defined arbitrarily. For example, the transparent member in the area C3 may be replaced with a color filter that transmits a light ray falling within the magenta (Mg) wavelength range (which will be referred to herein as an "Mg filter"). Optionally, part of the light transmitting plate 2 may be an opaque area.

On the imaging area $1a$ of the image sensor 1 shown in FIG. 2, there is an array of photosensitive cells that are arranged two-dimensionally and an array of color filters that are arranged to face those photosensitive cells in the array. The array of photosensitive cells and the array of color filters consist of multiple unit elements. And each unit element includes four photosensitive cells and four associated color filters that face them. Each of those photosensitive cells is typically a photodiode, which performs photoelectric conversion and outputs an electrical signal representing the quantity of the light received (which will be referred to herein as a "photoelectrically converted signal"). On the other hand, each color filter may be made of a known pigment and is designed so as to selectively transmit a light ray falling within a particular wavelength range.

Figure 4:
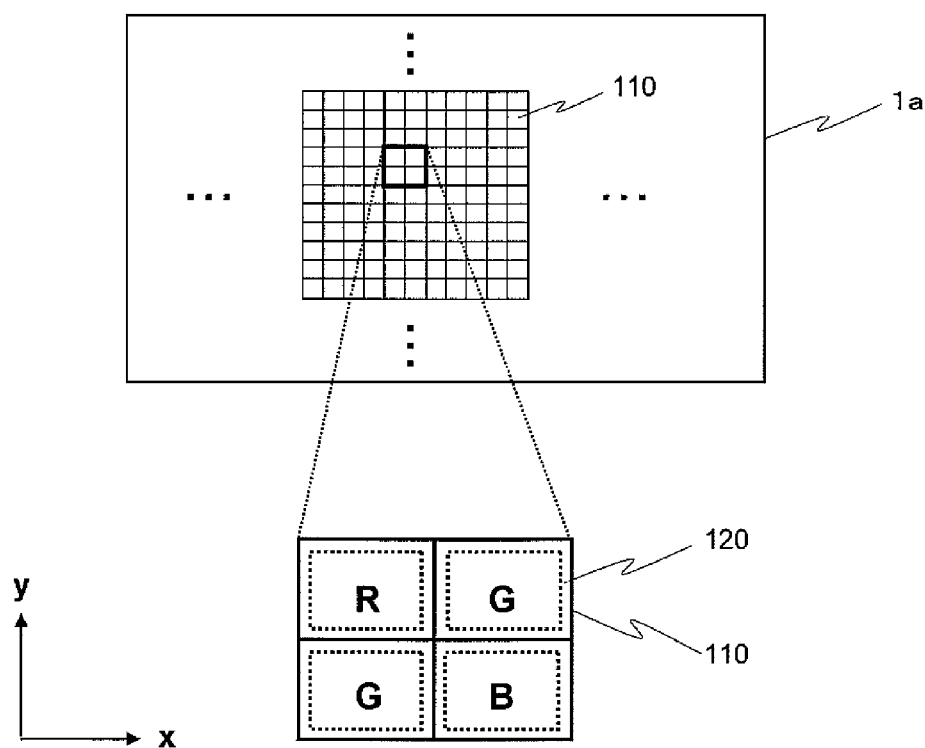
FIG. 4 illustrates a basic arrangement of color filters on an image sensor according to the first preferred embodiment.

FIG. 4 schematically illustrates a part of the array of color filters according to this preferred embodiment. As shown in FIG. 4, a lot of color filters 110 are arranged in columns and rows on the imaging area $1a$. In this preferred embodiment, four color filters 110 that are arranged close to each other and four photosensitive cells 120 that face those four color filters 110 form one unit element. In each unit element, a color filter that transmits a light ray falling within the red (R) wavelength range is arranged at the row 1, column 1 position, color filters that transmit a light ray falling within the green (G) wavelength range are arranged at the row 1, column 2 position and at the row 2, column 1 position, and a color filter that transmits a light ray falling within the blue (B) wavelength range is arranged at the row 2, column 2 position. As can be seen, the arrangement of the color filters 110 according to this preferred embodiment is a known Bayer arrangement consisting basically of two rows and two columns.

It should be noted that the photosensitive cells 120 and the color filters 110 doe not always have to have the Bayer arrangement but may also adopt any other known arrangement. Furthermore, the photosensitive cells 120 and the color filters 110 do not always have to be arranged in the x and y directions but may be tilted to the x and y directions as well. In that case, the information obtained is not about horizontal parallax but about oblique parallax.

Furthermore, it is not indispensable that each unit element includes four photosensitive cells and four color filters. But each unit element has only to include at least three photosensitive cells and at least three color filters. In any case, if the number of photosensitive cells or color filters included in each unit element is either equal to, or larger than, that of the light transmitting areas of the light transmitting plate 2 described above, image information can be obtained by performing the signal arithmetic operation to be described later.

According to such an arrangement, the light that has entered this image capture device during an exposure process passes through the light transmitting plate 2, the lens 3, the infrared cut filter 4 and the color filters 110 and then is incident on the photosensitive cells 120. Each of those photosensitive cells receives a light ray that has been transmitted through the area C1, C2 or C3 of the light transmitting plate 2 and then through its associated color filter, and outputs a photoelectrically converted signal representing the quantity of the light received. The photoelectrically converted signal that has been output from each photosensitive cell is sent to the signal processing section 200 by way of the signal generating and receiving section 5. In the signal processing section 200, the image signal generating section 7 generates a right-eye image, a left-eye image, and a color image based on the signals supplied from the image capturing section 100.

Hereinafter, the photoelectrically converted signals supplied from those photosensitive cells will be described. First of all, signals representing the intensities of light rays that have been incident on the areas C1, C2 and C3 of the light transmitting plate 2 will be identified herein by Ci1, Ci2 and Ci3, respectively, with a subscript "i" added. Also, the spectral transmittance of the transparent area C3 of the light transmitting plate 2, the lens 3 and the infrared cut filter 4 combined will be identified herein by Tw. And the spectral transmittances of the Cy and Ye filters will be identified herein by Tcy and Tye, respectively. In the same way, the spectral transmittances of the R, G and B color filters will be identified herein by Tr, Tg and Tb, respectively. In this case, Tw, Tcy, Tye, Tr, Tg and Tb are functions that depend on the wavelength $\lambda$ of the incoming light. Also, signals representing the intensities of light rays that have been transmitted through the R, G and B color filters and then received by photosensitive cells right under those color filters will be identified herein by Rs, Gs and Bs, respectively, with a subscript "s" added. Furthermore, the integration operation of the spectral transmittances in the visible radiation wavelength range will be identified herein by the sign $\Sigma$. For example, an integration operation $\int TwTcyTrd\lambda$ with respect to the wavelength $\lambda$ will be identified herein by $\Sigma TwTcyTr$. In this case, the integration is supposed to be performed in the entire visible radiation wavelength range. Then, Rs is proportional to the sum of Ci1 $\Sigma TwTcyTr$, Ci2 $\Sigma TwTyeTr$ and Ci3 $\Sigma TwTr$. Likewise, Gs is proportional to the sum of Ci1 $\Sigma TwTcyTg$, Ci2 $\Sigma TwTyeTg$ and Ci3 $\Sigma TwTg$. And Bs is proportional to the sum of Ci1 $\Sigma TwTcyTb$, Ci2 $\Sigma TwTyeTb$ and Ci3 $\Sigma TwTb$. In this case, the light rays that have been incident on C1, C2 and C3 are supposed to include respective wavelength components in the visible radiation range in almost equal quantities. Supposing the constant of proportionality with respect to these relations is one, Rs, Gs and Bs can be represented by the following Equations (1), (2) and (3), respectively:

$$Rs = Ci1 \Sigma TwTcyTr + Ci2 \Sigma TwTyeTr + Ci3 \Sigma TwTr \quad (1)$$

$$Gs = Ci1 \Sigma TwTcyTg + Ci2 \Sigma TwTyeTg + Ci3 \Sigma TwTg \quad (2)$$

$$Bs = Ci1 \Sigma TwTcyTb + Ci2 \Sigma TwTyeTb + Ci3 \Sigma TwTb \quad (3)$$

If $\Sigma$ TwTcyTr, $\Sigma$ TwTyeTr and $\Sigma$ TwTr of Equation (1) are represented by Mx11, Mx12 and Mx13, respectively, and if $\Sigma$ TwTcyTg, $\Sigma$ TwTyeTg and $\Sigma$ TwTg of Equation (2) are represented by Mx21, Mx22 and Mx23, respectively, and if $\Sigma$ TwTcyTb, $\Sigma$ TwTyeTb and $\Sigma$ TwTb of Equation (3) are represented by Mx31, Mx32 and Mx33, respectively, then the relation between Rs, Gs and Bs and Ci1, Ci2 and Ci3 can be given as a matrix by the following Equation (4):

$$\begin{pmatrix} Rs \\ Gs \\ Bs \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ci1 \\ Ci2 \\ Ci3 \end{pmatrix} \quad (4)$$

Supposing the respective elements of an inverse matrix, which is obtained by inverting the matrix consisting of the elements Mx11 through Mx33 as represented by Equation (4), are identified by iM11 through iM33, respectively, Equation (4) can be modified into the following Equation (5). That is to say, the signals representing the intensities of the light rays that have been incident on the areas C1, C2 and C3 can be represented by using the photoelectrically converted signals Rs, Gs and Bs:

$$\begin{pmatrix} Ci1 \\ Ci2 \\ Ci3 \end{pmatrix} = \begin{pmatrix} iM11 & iM12 & iM13 \\ iM21 & iM22 & iM23 \\ iM31 & iM32 & iM33 \end{pmatrix} \begin{pmatrix} Rs \\ Gs \\ Bs \end{pmatrix} \quad (5)$$

The image signal generating section 7 carries out a signal arithmetic operation based on this Equation (5), thereby generating signals Ci1, Ci2 and Ci3 on a unit element basis. These signals Ci1, Ci2 and Ci3 that have been generated on a unit element basis represent three images that have been produced by the light rays that were incident on the areas C1, C2 and C3, respectively. Among other things, the images represented by the signals Ci1 and Ci2 correspond to the images obtained by viewing the subject from the areas C1 and C2 that are spaced apart from each other in the x direction, and therefore, can be handled as a left-eye image and a right-eye image, respectively. That is to say, the two images represented by the signals Ci1 and Ci2 have parallax corresponding to the distance between the two areas C1 and C2. Consequently, information about the depth of the subject can be obtained from these images.

On the other hand, it can be said that Ci3 is a signal representing a normal image, not images with parallax. As Ci3 may have a similar part to Ci1 and Ci2, the levels of the signals Ci1 and Ci2 representing images with parallax can be increased by adding the signal Ci3 to the signals Ci1 and Ci2 in such a part. According to this preferred embodiment, since the planar area of the area C3 is greater than that of the area C1 or C2, the level of the signal Ci3 is higher than that of the signal Ci1 or Ci2. That is why it is effective to add a part of Ci3 to Ci1 and Ci2 in order to obtain good images with parallax. In this preferred embodiment, the greater the ratio in planar area of the area C3 to the area C1 or C2, the better. It should be noted that even when a normal image with no parallax is obtained, the greater the planar area of the area C3, the higher the level of the image signal obtained will be.

The image signals Ci1, Ci2 and Ci3 that have been obtained through the processing described above are represented by photoelectrically converted signals Rs, Gs and Bs but correspond to monochrome images, not color images. In order to obtain a color image instead of a monochrome image, normal color processing using a Bayer arrangement may be carried out on the photoelectrically converted signals thus obtained, instead of the signal arithmetic processing described above. In that case, some loss of the incoming light and a variation in color temperature may be caused by the Cy and Ye filters of the light transmitting plate 2. However, as these color filters have high optical transmittance, the loss of the incoming light can be smaller than in the prior art. Also, even an overall color shift, if any, can be coped with by adjusting the white balance. Thus, the image capture device of this preferred embodiment can obtain a good color image by using the incoming light highly efficiently.

Optionally, instead of performing normal color processing using a Bayer arrangement on the respective photoelectrically converted signals in order to obtain a color image, color information may also be obtained by using only the Ci3 term of Equation (4). That is to say, even by obtaining Ci3 by Equation (5) and then regarding Mx13×Ci3, Mx23×Ci3 and Mx33×Ci3 as representing the quantities of R, G and B light rays, respectively, a color image can also be obtained.

As described above, according to this preferred embodiment, a light-transmitting plate 2, including an area C1 in which a Cy filter is arranged, an area C2 in which a Ye filter is arranged and an area C3 that is a transparent member, and a color image sensor 1 with a Bayer arrangement are used. By obtaining a 3×3 matrix by performing integration operations on the spectral transmittances of an optical system and color filters and by carrying out signal arithmetic operations on the respective photoelectrically converted signal using that matrix, the image generating section 7 generates two images with parallax and a normal image that uses the incoming light highly efficiently. Furthermore, if either color processing for a normal Bayer arrangement or color processing that uses the signal Ci3 is carried out, a color image can be obtained by using the incoming light highly efficiently.

The image signal generating section 7 of this preferred embodiment can generate two images with parallax, and a monochrome image and a color image that use the incoming light highly efficiently as described above. However, the image signal generating section 7 does not always have to generate all of these images. Rather, the image signal generating section 7 just needs to be designed so as to generate at least two image data with parallax.

Figure 5:
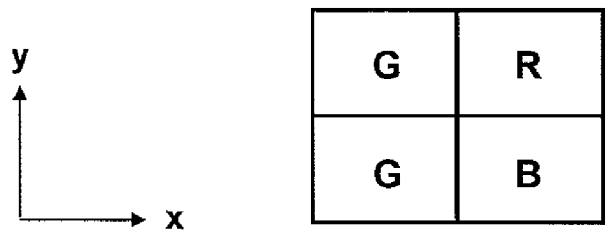
FIG. 5 illustrates another basic arrangement of color filters on an image sensor according to the first preferred embodiment.
Figure 6:
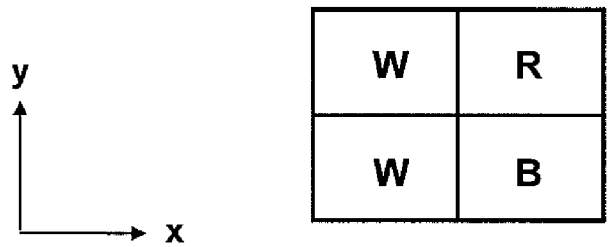
FIG. 6 illustrates still another basic arrangement of color filters on an image sensor according to the first preferred embodiment.

Also, in the preferred embodiment described above, color filters are arranged in the image sensor 1 using a Bayer type color scheme where RGB color filters are arranged. However, any other color filters or any other arrangement may also be used. For example, even when RGB color filters are used as in a Bayer type color scheme, R and B filters may be arranged on the same column as shown in FIG. 5. If such an arrangement is adopted, there is no pixel unit shift in the x direction between two photosensitive cells that face the R and B filters, respectively, and therefore, the accuracy of the parallax in the x direction can be increased. Alternatively, even if the G filters are replaced as shown in FIG. 6 with a transparent member that transmits visible radiation that covers the entire wavelength range and that is included in white light W, color representation can also be done in a similar manner. If the arrangement shown in FIG. 6 is adopted, then the transparent elements will transmit more light than the G filter does. As a result, the image sensor can use the incoming light even more efficiently, which is beneficial.

Figure 7A:
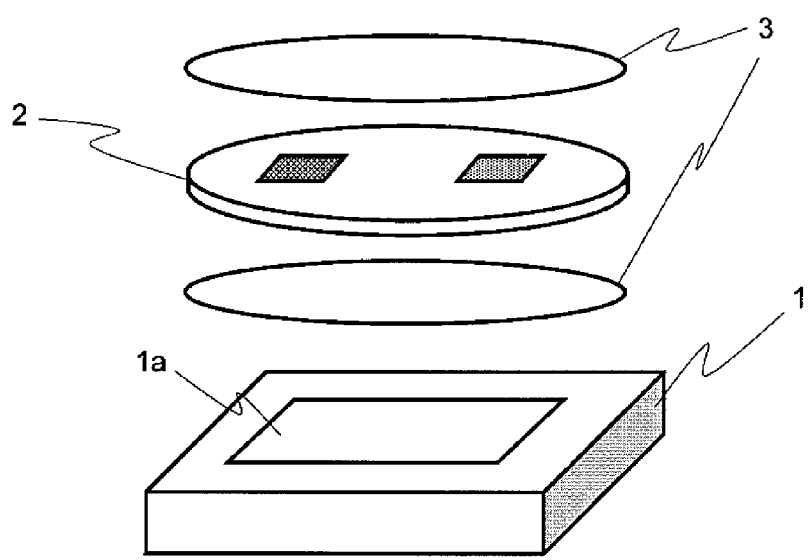
FIG. 7A illustrates a second exemplary arrangement of a light-transmitting plate, an optical system and an image sensor according to the first preferred embodiment.
Figure 7B:
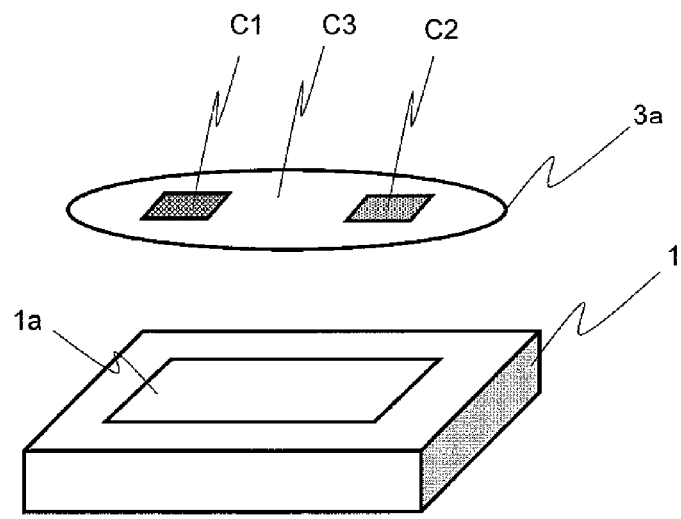
FIG. 7B illustrates a third exemplary arrangement of a light-transmitting plate, an optical system and an image sensor according to the first preferred embodiment.
Figure 7C:
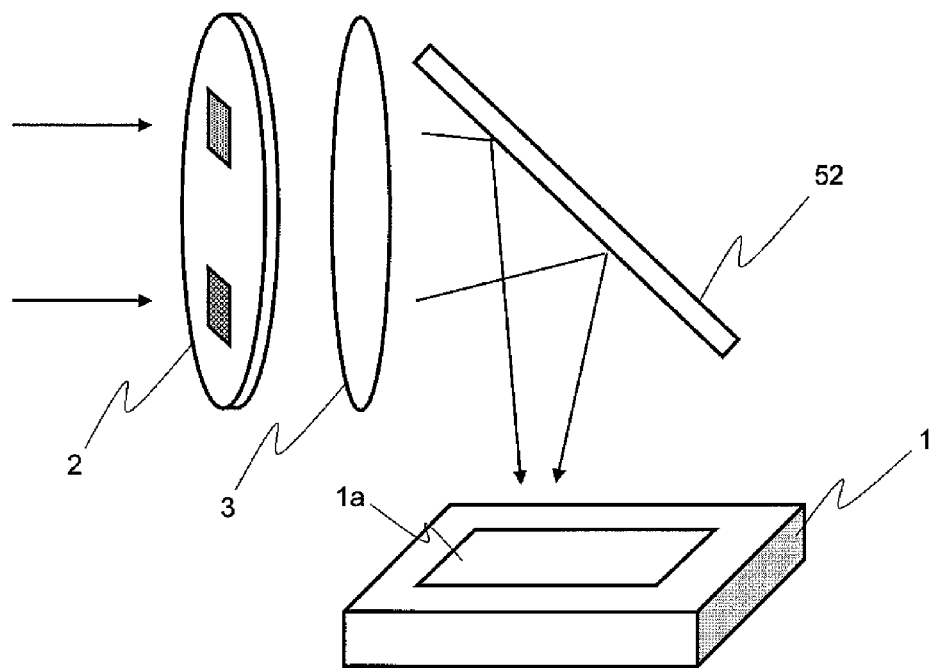
FIG. 7C illustrates a fourth exemplary arrangement of a light-transmitting plate, an optical system and an image sensor according to the first preferred embodiment.

As for the arrangement of the image capturing section 100, the arrangement of respective members shown in FIG. 2 is just an example, and the present invention is in no way limited to that specific preferred embodiment. Alternatively, as long as an image can be produced on the imaging area 1*a*, the lens 3 may be arranged more distant from the image sensor 1 than the light-transmitting plate 2 is. Still alternatively, multiple lenses 3 may be arranged and the light-transmitting plate 2 may be interposed between those lenses 3 as shown in FIG. 7A. Furthermore, the lens 3 and the light-transmitting plate 2 do not always have to be two independent members but may also be implemented as a single optical element 3*a* as shown in FIG. 7B. In the arrangement shown in FIG. 7B, areas C1 and C2 that transmit light rays falling within mutually different wavelength ranges are defined as respective parts of the lens. What is more, the light-transmitting plate 2 and the imaging area of the image sensor 1 do not always have to be arranged parallel to each other. For example, by arranging an optical element 52 that reflects light such as a mirror or a prism between the light-transmitting plate 2 and the image sensor 1 as shown in FIG. 7C, the light-transmitting plate 2 and the imaging area of the image sensor 1 may be arranged on two planes that intersect with each other.

The image capture device of this preferred embodiment performs signal arithmetic operation on photoelectrically converted signals that have been obtained by the image sensor, thereby generating an image. However, the processing of generating an image by performing the signal arithmetic operation may also be performed by another device, which is independent of the image capture device. For example, the effects of the present invention described above can also be achieved even by supplying the signal that has been obtained by the image capture device with the image capturing section 100 of this preferred embodiment to another device and by getting a program defining the signal arithmetic processing described above executed by that another device.

(Embodiment 2)

Hereinafter, a second specific preferred embodiment of the present invention will be described with reference to FIGS. 8 and 9. The image capture device of this second preferred embodiment has a different arrangement of a transparent area in the light-transmitting plate 2 and a different arrangement of color filters in the image sensor 1 than in the image capture device of the first preferred embodiment described above. Thus, the following description of the second preferred embodiment will be focused on those differences and description of their common features will be omitted herein.

Figure 8:
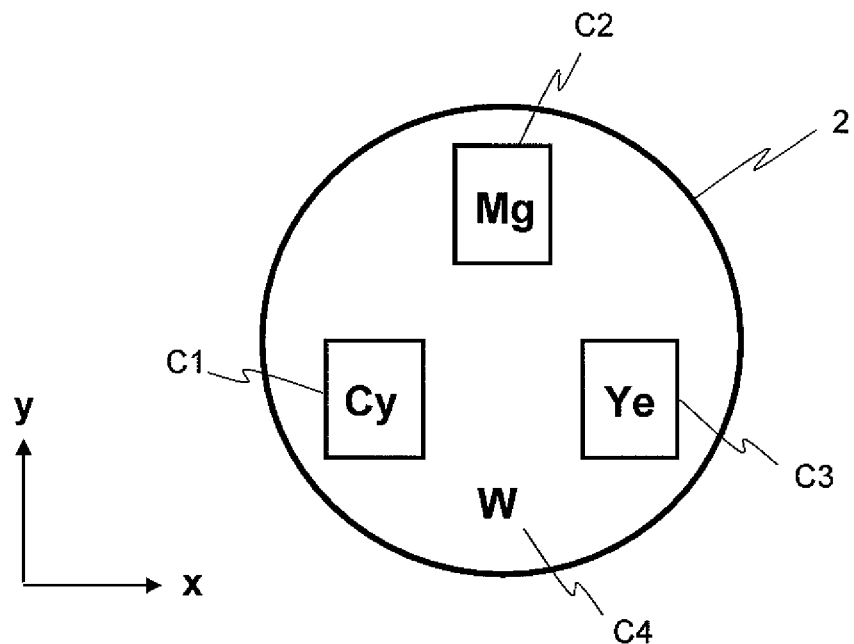
FIG. 8 illustrates an arrangement of light-transmitting areas on a light transmitting plate according to a second preferred embodiment of the present invention.

FIG. 8 is a front view of a light-transmitting plate 2 according to this preferred embodiment. The light-transmitting plate 2 has a circular shape just like the optical lens 3 but may also have any other shape. In this preferred embodiment, a Cy filter that transmits a cyan ray is arranged in an area C1, an Mg filter that transmits a magenta ray is arranged in an area C2, a Ye filter that transmits a yellow ray is arranged in an area C3, and the other area C4 is a transparent area W made of a transparent member.

Figure 9:
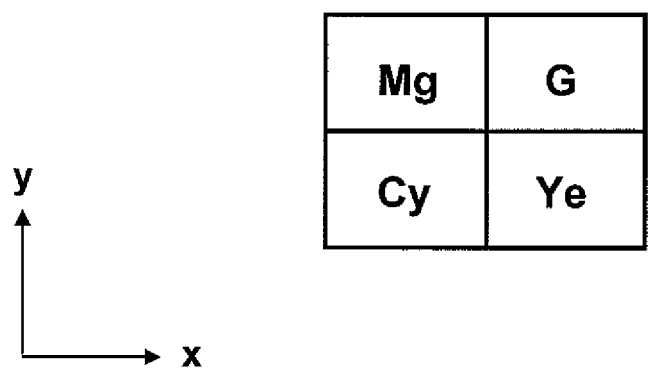
FIG. 9 illustrates a basic arrangement of color filters on an image sensor according to the second preferred embodiment.

FIG. 9 illustrates a basic arrangement for an array of color filters that is arranged on the imaging area 1*a* of the image sensor 1 of this preferred embodiment. This array of color filters consists of Mg, G, Cy and Ye filters, which are arranged to form a 2×2 matrix as its fundamental unit. In the example illustrated in FIG. 9, Mg, G, Cy and Ye filters are arranged at a row 1, column 1 position, at a row 1, column 2 position, at a row 2, column 1 position, and at a row 2, column 2 position, respectively. However, these color filters may be arranged in any arbitrary pattern.

With such an arrangement, each of those photosensitive cells receives a light ray that has been transmitted through the area C1, C2, C3 or C4 of the light transmitting plate 2 and then through its associated color filter. Hereinafter, photoelectrically converted signals generated by the respective photosensitive cells will be described.

In this preferred embodiment, the light rays that have been incident on the areas C1, C2, C3 and C4 are supposed to include respective wavelength components in the visible radiation range in almost equal quantities. The respective signs are supposed to have the same meanings as in the first preferred embodiment described above. Nevertheless, the spectral transmittances Tmg, Tcy and Tye of the Mg, Cy and Ye filters of the light-transmitting plate 2 are supposed to be the same as those of the Mg, Cy and Ye filters of the array of color filters. Furthermore, the light rays that have been transmitted through the Mg, Cy and Ye color filters in the array of color filters and then photoelectrically converted by the photosensitive cells that are located right under those color filters are identified by Ms, Cs and Ys, respectively. Then, Ms is proportional to the sum of Ci1 Σ TwTcyTmg, Ci2 Σ TwTmgTmg, Ci3 Σ TwTyeTmg and Ci4 Σ TwTmg. Likewise, Gs is proportional to the sum of Ci1 Σ TwTcyTg, Ci2 Σ TwTmgTg, Ci3 Σ TwTyeTg and Ci4 Σ TwTg. Cs is proportional to the sum of Ci1 Σ TwTcyTcy, Ci2 Σ TwTmgTcy, Ci3 Σ TwTyeTcy, and Ci4 Σ TwTcy. Ys is proportional to the sum of Ci1 Σ TwTcyTye, Ci2 Σ TwTmgTye, Ci3 Σ TwTyeTye and Ci4 Σ TwTye. If these factors of proportionality are supposed to be one, Ms, Gs, Cs and Ys can be represented by the following Equations (6) to (9), respectively:

$$Ms = Ci1\Sigma TwTcyTmg + Ci2\Sigma TwTmgTmg + Ci3 + \Sigma TwTyeTmg + Ci4\Sigma TwTmg \quad (6)$$

$$Gs = Ci1\Sigma TwTcyTg + Ci2\Sigma TwTmgTg + Ci3\Sigma TwTyeTg + Ci4\Sigma TwTg \quad (7)$$

$$Cs = Ci1\Sigma TwTcyTcy + Ci2\Sigma TwTmgTcy + Ci3\Sigma TwTyeTcy + Ci4\Sigma TwTcy \quad (8)$$

$$Ys = Ci1\Sigma TwTcyTye + Ci2\Sigma TwTmgTye + Ci3\Sigma TwTyeTye + Ci4\Sigma TwTye \quad (9)$$

If Σ TwTcyTmg, Σ TwTmgTmg, Σ TwTyeTmg and Σ TwTmg of Equation (6) are represented by Mx11, Mx12, Mx13 and Mx14, respectively, if Σ TwTcyTg, Σ TwTmgTg, Σ TwTyeTg and Σ TwTg of Equation (7) are represented by Mx21, Mx22, Mx23 and Mx24, respectively, and if Σ TwTcyTcy, Σ TwTmgTcy, Σ TwTyeTcy and Σ TwTcy of Equation (8) are represented by Mx31, Mx32, Mx33 and Mx34, respectively, and if Σ TwTcyTye, Σ TwTmgTye, Σ TwTyeTye and Σ TwTye of Equation (9) are represented by Mx41, Mx42, Mx43 and Mx44, respectively, then the relation between Ms, Gs, Cs and Ys and Ci1, Ci2, Ci3 and Ci4 is given as a matrix by the following Equation (10):

$$\begin{pmatrix} Ms \\ Gs \\ Cs \\ Ys \end{pmatrix} = \begin{pmatrix} Mx11 & Mx12 & Mx13 & Mx14 \\ Mx21 & Mx22 & Mx23 & Mx24 \\ Mx31 & Mx32 & Mx33 & Mx34 \\ Mx41 & Mx42 & Mx43 & Mx44 \end{pmatrix} \begin{pmatrix} Ci1 \\ Ci2 \\ Ci3 \\ Ci4 \end{pmatrix} \quad (10)$$

Supposing the respective elements of an inverse matrix, which is obtained by inverting the matrix consisting of the elements Mx11 through Mx44 as represented by Equation (10), are identified by iM11 through iM44, respectively, Equation (10) can be modified into the following Equation (11). That is to say, the signals representing the intensities of the light rays that have been incident on the areas C1, C2, C3 and C4 can be represented by using the photoelectrically converted signals Ms, Gs, Cs and Ys:

$$\begin{pmatrix} Ci1 \\ Ci2 \\ Ci3 \\ Ci4 \end{pmatrix} = \begin{pmatrix} iM11 & iM12 & iM13 & iM14 \\ iM21 & iM22 & iM23 & iM24 \\ iM31 & iM32 & iM33 & iM34 \\ iM41 & iM42 & iM43 & iM44 \end{pmatrix} \begin{pmatrix} Ms \\ Gs \\ Cs \\ Ys \end{pmatrix} \quad (11)$$

By generating the signals Ci1, Ci2, Ci3 and Ci4 represented by Equation (11) on a unit element basis, four images that have been produced by the light rays that were incident on the areas C1, C2, C3 and C4, respectively, can be obtained.

Among other things, the images represented by the signals Ci1 and Ci3 correspond to the images obtained by viewing the subject from the areas C1 and C3 that are spaced apart from each other in the x direction, and therefore, can handled as a left-eye image and a right-eye image, respectively. Meanwhile, Ci2 corresponds to an image obtained by viewing the subject from the area C2, which is arranged obliquely to the areas C1 and C3, and is an image representing oblique parallax with respect to Ci1 and Ci2.

On the other hand, the image represented by Ci4 is an image (a monochrome image) produced by the light ray that has been incident on the transparent area C4 and is a normal image with no parallax. That is why the larger the ratio in planar area of the area C4 to the other areas C1, C2 and C3, the higher the level of the signal Ci4 representing an image (a monochrome image) can be.

According to this preferred embodiment, in order to obtain a color image, a luminance signal YI and color difference signals RY and BY represented by the following Equations (12) to (14) may be obtained without performing the processing described above:

$$Yl = Ms + Gs + Cs + Ys \quad (12)$$

$$RY = Ms - Gs - Cs + Ys \quad (13)$$

$$BY = Ms - Gs + Cs - Ys \quad (14)$$

By converting the luminance signal YI and the color difference signals RY and BY obtained by these Equations (12) to (14) into RGB signals by the method adopted in the NTSC standard, for example, a color image can be obtained. Since the Cy, Mg and Ye filters arranged in the light-transmitting plate 2 have relatively high optical transmittances, the color image thus obtained has been generated by using the incoming light highly efficiently.

Optionally, as in the first preferred embodiment described above, color information may be obtained by using only the term about the signal Ci4 representing an image that has been produced by the light ray that was incident on the transparent area C4. In that case, first of all, Ci4 needs to be obtained by performing arithmetic processing based on Equation (11) and then Ms=Ci4 $\Sigma$ TwTmg, Gs=Ci4 $\Sigma$ TwTg, Cs=Ci4 $\Sigma$ TwTcy and Ys=Ci4 $\Sigma$ TwTye need to be substituted in Equations (12) to (14) described above.

As described above, according to this preferred embodiment, a light-transmitting plate 2, in which Cy, Mg and Ye filters are arranged separately from each other and of which the rest is a transparent member, and a color image sensor with an array of magenta (Mg), green (G), cyan (Cy) and yellow (Ye) color filters, which are arranged to form a 2×2 matrix as a fundamental unit, are used. By obtaining a 4×4 matrix by performing integration operations on the spectral transmittances of an optical system and color filters and by carrying out arithmetic operations on the respective photoelectrically converted signals supplied from the image sensor using that matrix, multiple images with parallax and a normal image that uses the incoming light highly efficiently can be obtained. Furthermore, by performing color processing that generates a luminance signal and color difference signals by using the respective photoelectrically converted signals of the image sensor 1 directly, a color image can be obtained by using the incoming light highly efficiently.

In this preferred embodiment, the light-transmitting plate 2 consists of an area C1 where a Cy filter is arranged, an area C2 where a Mg filter is arranged, an area C3 where a Ye filter is arranged, and a transparent area C4. However, these four areas including the transparent area do not always have to be arranged as described above. Rather those areas may be arranged in any other pattern as long as those areas have mutually different transmission wavelength ranges and as long as their transmittances are relatively high.

As for the combination of color filters for use in the image0 sensor, the combination of Mg, G, Cy and Ye does not always have to be used. As long as those color filters have mutually different transmission wavelength ranges, color filters may be used in any other combination of colors.

In the first and second preferred embodiments of the present invention described above, the light-transmitting plate is supposed to have three or four light-transmitting areas, and the number of different kinds of color filters included in each unit element of the image sensor is also supposed to be three or four, i.e., as large as the number of the light-transmitting areas. However, according to the present invention, the number of light-transmitting areas and the number of different kinds of color filters do not always have to be three or four. For example, the number of different kinds of color filters included in each unit element may be larger than that of the light-transmitting areas. Even so, image information can still be obtained by performing signal arithmetic operations based on the equation representing the relation between the photoelectrically converted signals generated by respective photosensitive cells and the quantities of the light incident on those light-transmitting areas.

Optionally, the number of the light-transmitting areas and the number of different kinds of color filters included in each unit element may be greater than four. Speaking more generally, a 3D image capture device according to the present invention may include a light-transmitting section that has n light-transmitting areas (where n is an integer that is equal to or greater than three) with mutually different transmission wavelength ranges and n color filters with mutually different transmission wavelength ranges, which are included in each unit element. Nevertheless, a light ray that is transmitted through at least one of the n light-transmitting areas needs to be transmitted through at least two color filters in each unit element.

Figure 10:
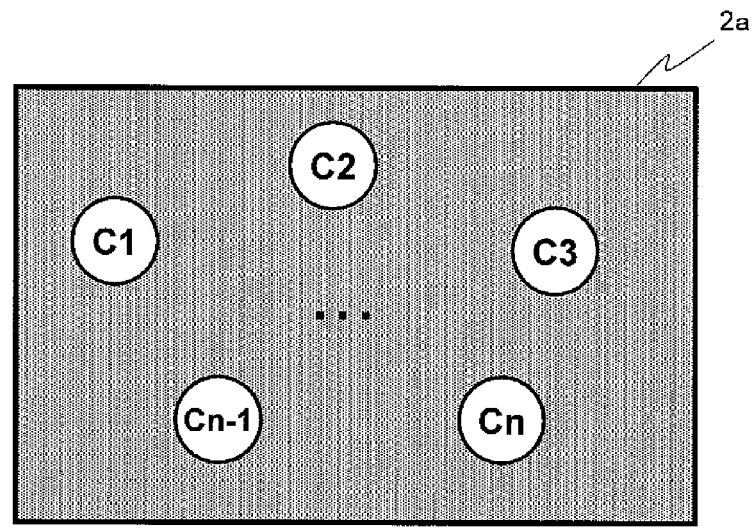
FIG. 10 illustrates an example of a light-transmitting section with n light-transmitting areas.

FIG. 10 illustrates an example of such a generalized light-transmitting section 2a. The light-transmitting section 2a has a rectangular shape in the example illustrated in FIG. 10, but may also have any other shape. In this example, the light-transmitting section 2a has n light-transmitting areas C1 through Cn, and the rest of the light-transmitting section 2a is an opaque area. In this case, the light-transmitting areas C1 through Cn have mutually different transmission wavelength ranges. From the standpoint of optical efficiency, it is preferred that each of the light-transmitting areas C1 through Cn be designed so as to be either transparent or transmit a light ray falling within the wavelength range of its complementary color. In FIG. 10, the respective light-transmitting areas are illustrated as if all of those areas had the same shape and the same size. However, their shapes or sizes may be different from each other.

Figure 11:
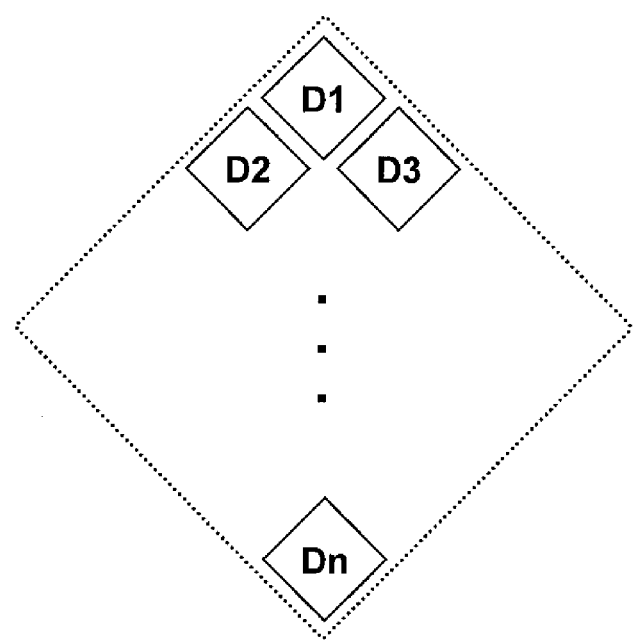
FIG. 11 illustrates an exemplary arrangement of n color filters in each unit element.

FIG. 11 illustrates an example of such a generalized arrangement of color filters in each unit element of the image sensor. As shown in FIG. 11, each unit element has color filters D1 through Dn, of which the transmission wavelength ranges are different from each other. The color filters do not have to be arranged as shown in FIG. 11 but may also be arranged in any other pattern.

In the exemplary arrangement described above, in order to increase the optical efficiency as much as possible, the respective light-transmitting areas and the respective color filters are preferably designed so that one of the light-transmitting areas C1 through Cn that has a broader transmission wavelength range than any other light-transmitting area has an even broader transmission wavelength range than one of the color filters D1 through Dn that has a broader transmission wavelength range than any other color filter.

With such generalization adopted, the relation between the image signals Ci1, Ci2, Ci3, . . . and Cin representing the light rays that have been incident on the respective light-transmitting areas of the light-transmitting section 2a and the photoelectrically converted signals Ds1, Ds2, Ds3, . . . and Dsn supplied from the photosensitive cells associated with the respective color filters of the image sensor can be represented by the following Equation (15):

$$\begin{pmatrix} Ds1 \\ Ds2 \\ Ds3 \\ \vdots \\ Dsn \end{pmatrix} = \begin{pmatrix} Mx11 & Mx12 & Mx13 & \ldots & Mx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix} \begin{pmatrix} Ci1 \\ Ci2 \\ Ci3 \\ \vdots \\ Cin \end{pmatrix} \quad (15)$$

If pieces of image information Ci1 through Cin are obtained by Equation (15), the optical properties of the image capturing system are preferably defined so that the determinant of the n×n matrix, consisting of elements Mx11 through Mxnn, does not have a value close to zero. Supposing the elements of an inverse matrix, which is obtained by inverting the n×n matrix of Equation (15), are iM11 through iMnn, Equation (15) can be modified into the following Equation (16):

$$\begin{pmatrix} Ci1 \\ Ci2 \\ Ci3 \\ \vdots \\ Cin \end{pmatrix} = \begin{pmatrix} iM11 & iM12 & iM13 & \ldots & iM1n \\ iM21 & iM22 & iM23 & \ldots & iM2n \\ iM31 & iM32 & iM33 & \ldots & iM3n \\ \vdots & \vdots & \vdots & \ddots & \vdots \\ iMn1 & iMn2 & iMn3 & \ldots & iMnn \end{pmatrix} \begin{pmatrix} Ds1 \\ Ds2 \\ Ds3 \\ \vdots \\ Dsn \end{pmatrix} \quad (16)$$

By performing signal arithmetic processing based on this Equation (16), signals Ci1 through Cin representing the intensities of light rays that were incident on the light-transmitting areas C1 through Cn can be generated based on the photoelectrically converted signals Ds1 through Dsn. In this manner, n image data with parallax can be generated.

Even when such generalization is adopted, by adding any of the signals Ci1 through Cin to another one, the signal level of the latter signal can be increased. In that case, a signal representing a light ray that has been incident on either a light-transmitting area with the broadest transmission wavelength range or a light-transmitting area with the largest area is preferably added to that another signal. Likewise, even when color information is obtained, RGB color signals are preferably obtained by using a signal representing a light ray that has been incident on either a light-transmitting area with the broadest transmission wavelength range or a light-transmitting area with the largest area.

Optionally, the image capture device may also be designed so as to generate at least two of the signals Ci1 through Cin, not all of them. Even so, at least two pieces of image data with parallax can be obtained.

Figure 12:
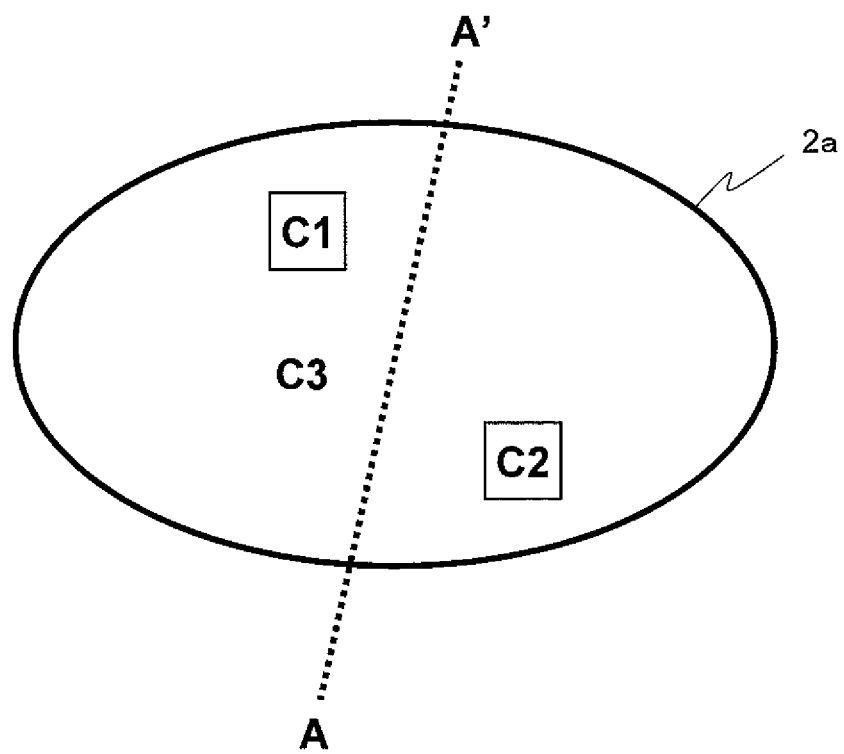
FIG. 12 illustrates a preferred arrangement of light-transmitting areas on a light-transmitting section.
Figure 13:
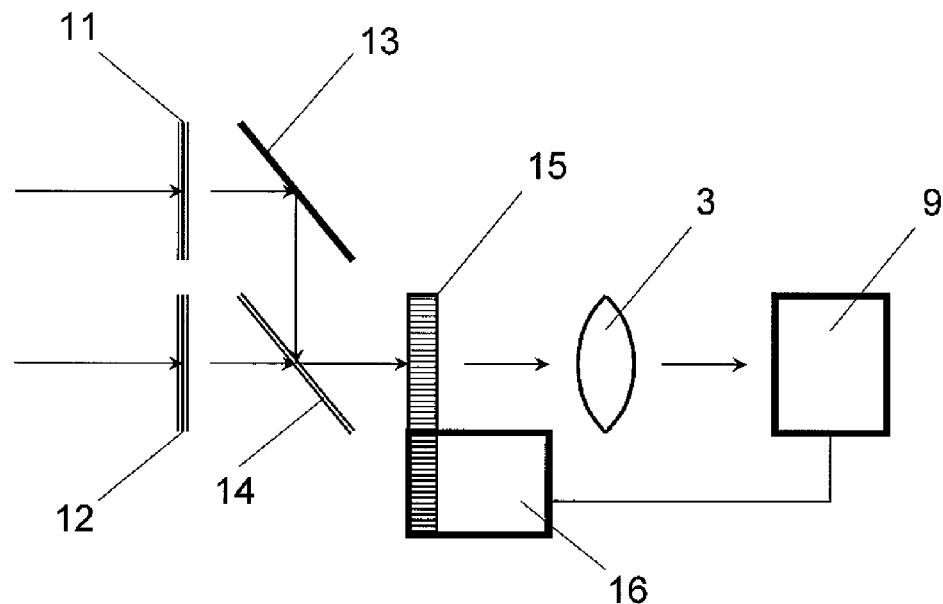
FIG. 13 illustrates the arrangement of an image capturing system according to Patent Document No. 1.
Figure 14:
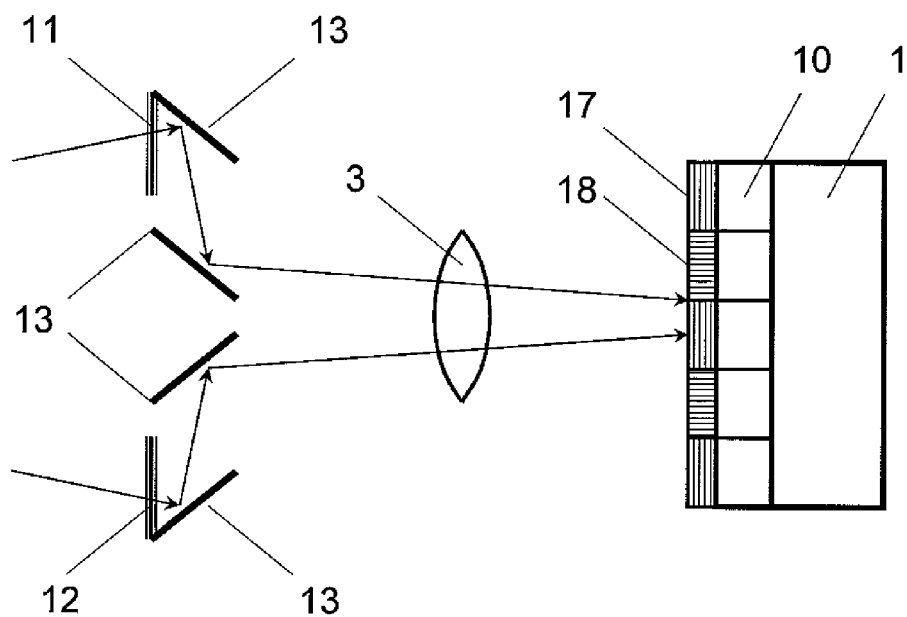
FIG. 14 illustrates the arrangement of an image capturing system according to Patent Document No. 2.
Figure 15:
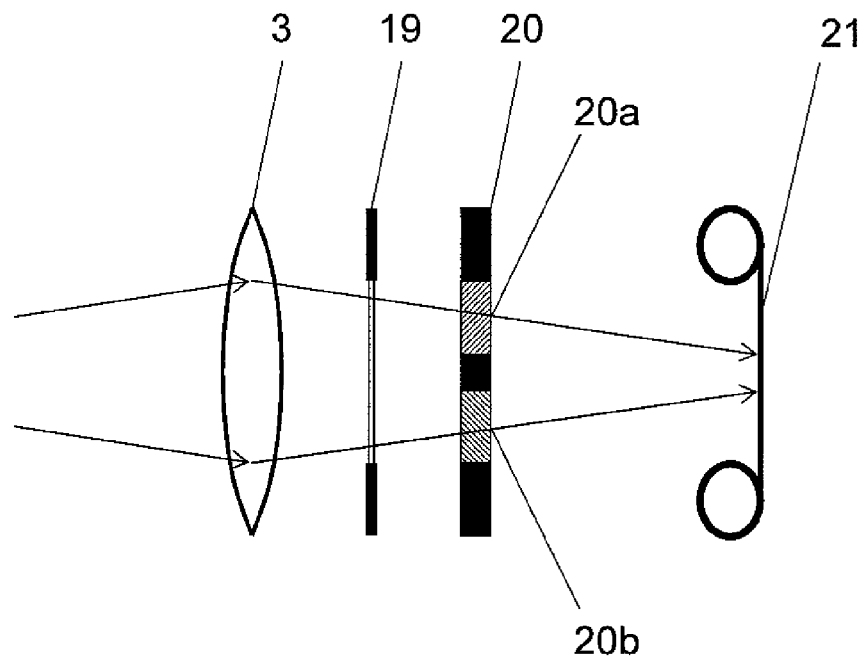
FIG. 15 illustrates the arrangement of an image capturing system according to Patent Document No. 4.
Figure 16:
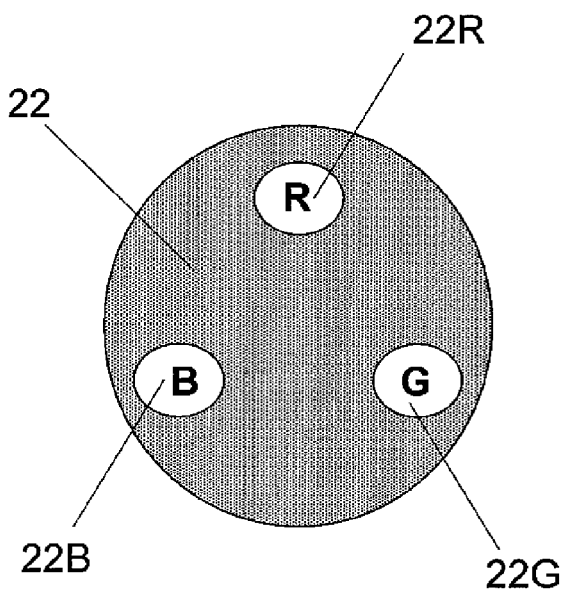
FIG. 16 illustrates the appearance of a light beam confining plate according to Patent Document No. 5.
Figure 17:
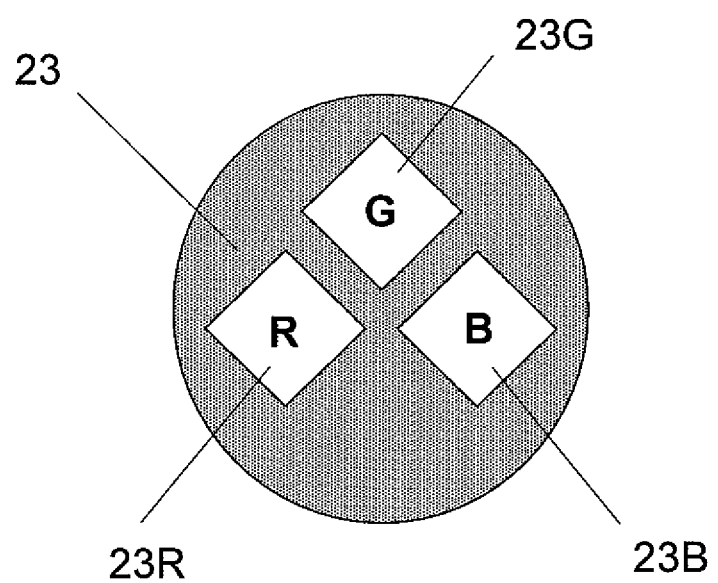
FIG. 17 illustrates the appearance of a light beam confining plate according to Patent Document No. 6.

Also, in order to obtain images with parallax effectively according to the present invention, if attention is paid to any two of the n light-transmitting areas, it is preferred that those two light-transmitting areas be arranged sufficiently distant from each other. Take a light-transmitting section 2a shown in FIG. 12 as an example. In this case, the two light-transmitting areas C1 and C2 are preferably arranged on mutually opposite sides with respect to a line segment A-A' that passes through the center of the light-transmitting section 2a and that divides the area of the light receiving plane of the light-transmitting section 2a into two as shown in FIG. 12. It is even more preferred that another light-transmitting area C3 be arranged between the light-transmitting areas C1 and C2 so that the light-transmitting areas C1 and C2 are arranged totally separately from each other. It should be noted that to obtain an image by using the incoming light highly efficiently with such an arrangement, it is preferred that the light-transmitting area C3 be made of a transparent member. Furthermore, C3 preferably has a broader area than C1 or C2.

INDUSTRIAL APPLICABILITY

The 3D image capture device of the present invention can be used effectively in every camera that uses a solid-state image sensor, and may be used in digital still cameras, digital camcorders and other consumer electronic cameras and in industrial solid-state surveillance cameras, to name just a few.

REFERENCE SIGNS LIST 1 solid-state image sensor
1a imaging area of the solid-state image sensor
2 light-transmitting plate
2a light-transmitting section
3 optical lens
3a optical element in which functions of light-transmitting plate and optical lens are combined together
4 infrared cut filter
5 signal generating and receiving section
6 sensor driving section
7 image signal generating section
8 interface section
9 image capture device
10 pixel
11 0-degree-polarization polarizer
12 90-degree-polarization polarizer
13 reflective mirror
14 half mirror
15 circular polarization filter
16 driver that rotates polarization filter
17, 18 polarization filter
19 diaphragm of lens
20, 22, 23 light beam confining plate
20a color filter that transmits red-based light ray 20b color filter that transmits blue-based light ray
21 photosensitive film
22R, 23R R ray transmitting areas of light beam confining plate
22G, 23G G ray transmitting areas of light beam confining plate
22B, 23B B ray transmitting areas of light beam confining plate
30 memory
52 optical element that reflects light
100 image capturing section
110 color filter
120 photosensitive cell
200 signal processing section

The invention claimed is:

1. A 3D image capture device comprising:
a light-transmissive section with N light-transmissive areas (where N is an integer that is equal to or greater than three) that have mutually different transmission wavelength ranges;
a solid-state image sensor including a photosensitive cell array and a color filter array that is arranged to face the photosensitive cell array, the solid-state image sensor being arranged to receive the light that has been transferred through the light-transmissive section, wherein the photosensitive cell array and the color filter array are both made up of a number of unit elements and wherein each said unit element includes N photosensitive cells and N color filters, each said color filter being arranged to face an associated one of the N photosensitive cells, the color filters having mutually different transmission wavelength ranges;
an optical system configured to produce an image on an imaging area of the solid-state image sensor; and
a signal processing section configured to process the output signal of the solid-state image sensor,
wherein the transmission wavelength ranges of the N light-transmissive areas and the N color filters are defined such that the light that has been transferred through at least one of the N light-transmissive areas is transmissible through at least two of the N color filters, and
wherein the signal processing section:
generates data representing at least two images with parallax by generating signals representing at least two of the respective intensities of light rays that are incident on the N light-transmissive areas based on the output signals of the N photosensitive cells, and
adds a signal representing the intensity of a light ray that has been incident on one of the N light-transmissive areas to a signal representing the intensity of a light ray that has been incident on another one of the transmissive areas, thereby raising the level of the signal representing the intensity of the light ray that has been incident on the latter transmissive area.

2. The 3D image capture device of claim 1, wherein the signal processing section generates data representing N images by generating signals representing the respective intensities of light rays that are incident on the N light-transmissive areas based on the output signals of the N photosensitive cells.

3. The 3D image capture device of claim 1, wherein first and second areas that are included in the N light transmissive areas are arranged on mutually opposite sides with respect to a line segment that passes the center of the light-transmissive section and that divides the area of the light-receiving plane of the light-transmissive section into two.

4. The 3D image capture device of claim 3, wherein at least a part of a third area that is also included in the N light-transmissive areas is located between the first and second areas.

5. The 3D image capture device of claim 4, wherein the third area is a transparent area.

6. The 3D image capture device of claim 3, wherein the transmission wavelength ranges of the first and second areas are wavelength ranges representing mutually different complementary colors.

7. The 3D image capture device of claim 4, wherein the first and second areas have the same planar area, and
wherein the third area has a larger planar area than the first and second areas.

8. The 3D image capture device of claim 1, wherein the broadest transmission wavelength range of one of the N light-transmissive areas is even broader than the broadest transmission wavelength range of one of the N color filters.

9. The 3D image capture device of claim 1, wherein each of the N light-transmissive areas is either transparent or designed to transfer a light ray falling within the wavelength range associated with its complementary color.

10. The 3D image capture device of claim 1, wherein N=3.

11. The 3D image capture device of claim 10, wherein the N light-transmissive areas are a cyan area that transfers a cyan ray, a yellow area that transfers a yellow ray, and a transparent area.

12. The 3D image capture device of claim 10, wherein the N light-transmissive areas are a cyan area that transmits a cyan ray, a yellow area that transfers a yellow ray, and a magenta area that transfers a magenta ray.

13. The 3D image capture device of claim 10, transfers the N color filters are a red filter that transfers a red ray, a green filter that transfers a green ray, and a blue filter that transfers a blue ray.

14. The 3D image capture device of claim 10, wherein each said unit element includes four photosensitive cells, which are arranged in columns and rows to form a matrix, and four color filters, each of which is arranged to face an associated one of the four photosensitive cells, and
wherein two of the four color filters, which are arranged at a row 1, column 1 position and a row 2, column 1 position, respectively, are either transparent filters or green filters that transfers a green ray, while the other two color filters are a red filter that transfers a red ray and a blue filter that transfers a blue ray.

15. The 3D image capture device of claim 1, wherein N=4.

16. The 3D image capture device of claim 15, wherein the N light-transmissive areas are a cyan area that transfers a cyan ray, a yellow area that transfers a yellow ray, a magenta area that transfers a magenta ray and a transparent area.

17. The 3D image capture device of claim 15, wherein the N color filters are a magenta filter that transfers a magenta ray, a green filter that transfers a green ray, a cyan filter that transfers a cyan ray, and a yellow filter that transfers a yellow ray.

18. The 3D image device of claim 1, wherein the signal processing section adds a signal representing the intensity of a light ray that has been incident on one of the N light transmissive areas that has the broadest transmission wavelength range to a signal representing the intensity of a light ray that has been incident on another one of the transmissive areas, thereby raising the level of the signal representing the intensity of the light ray that has been incident on the latter transmissive area.

19. The 3D image capture device of claim 1, wherein the signal processing section obtains color information using a signal representing the intensity of a light ray that has been incident on one of the N light-transmissive areas that has the broadest transmission wavelength range.

* * * * *